(12) United States Patent  
Fang et al.

(10) Patent No.: US 12,423,028 B2  
(45) Date of Patent: Sep. 23, 2025

(54) HARDWARE QUEUE HANDLING SYSTEM, METHOD, SOLID STATE DRIVE CONTROLLER, AND SOLID-STATE DRIVE

(71) Applicant: DapuStor Corporation, Shenzhen (CN)

(72) Inventors: Haojun Fang, Shenzhen (CN); Yunxin Huang, Shenzhen (CN); Chengjian Yan, Shenzhen (CN)

(73) Assignee: DapuStor Corporation, Shenzhen (CN)

( * ) Notice: Subject to any disclaimer, the term of this patent is extended or adjusted under 35 U.S.C. 154(b) by 0 days.

(21) Appl. No.: 18/385,176

(22) Filed: Oct. 30, 2023

(65) Prior Publication Data

US 2024/0078045 A1 Mar. 7, 2024

Related U.S. Application Data

(63) Continuation of application No. PCT/CN2022/090464, filed on Apr. 29, 2022.

(30) Foreign Application Priority Data

Apr. 30, 2021 (CN) .......................... 202110484661.6

(51) Int. Cl.  
*G06F 3/06* (2006.01)

(52) U.S. Cl.  
CPC .......... *G06F 3/0659* (2013.01); *G06F 3/0604* (2013.01); *G06F 3/0679* (2013.01)

(58) Field of Classification Search  
CPC .... G06F 3/0604; G06F 3/0611; G06F 3/0659; G06F 3/0679  
See application file for complete search history.

(56) References Cited

U.S. PATENT DOCUMENTS

| | | | |
|---|---|---|---|
| 9,632,932 B1 | 4/2017 | Sutardja et al. | |
| 10,691,587 B2 * | 6/2020 | Chang | ..................... G06F 12/00 |
| 2017/0286337 A1 * | 10/2017 | Wang | .................. G06F 12/1027 |
| 2018/0060256 A1 * | 3/2018 | Walker | ................ G06F 13/1642 |
| 2018/0191630 A1 | 7/2018 | Kenny et al. | |
| 2018/0267909 A1 * | 9/2018 | Aden | .................. G06F 13/1663 |

(Continued)

FOREIGN PATENT DOCUMENTS

| | | | |
|---|---|---|---|
| CN | 108664335 A | 10/2018 | |
| CN | 111708489 A | 9/2020 | |

(Continued)

OTHER PUBLICATIONS

Office action issued in corresponding Chinese Application No. 202110484661.6, dated May 25, 2022, 11 pages.

(Continued)

*Primary Examiner* — Aracelis Ruiz  
(74) *Attorney, Agent, or Firm* — Bayes PLLC

(57) ABSTRACT

A hardware queue handling system and method, a solid state drive controller, and a solid state drive are disclosed. A main module of a hardware queue handler module and a mapping module of the hardware queue handler are connected respectively to one of the processing module or hardware module through an internal bus in a vicinity; a synchronizer module is configured to actively synchronize information between the main module and the mapping module.

15 Claims, 15 Drawing Sheets

(56) References Cited

U.S. PATENT DOCUMENTS

2019/0369911 A1 12/2019 Rai et al.
2020/0081834 A1 3/2020 Desai et al.
2021/0064430 A1 3/2021 Srivastava et al.

FOREIGN PATENT DOCUMENTS

CN 112035381 A 12/2020
CN 113377288 A 9/2021

OTHER PUBLICATIONS

Office action issued in corresponding Chinese Application No. 202110484661.6, dated Dec. 28, 2022, 8 pages.
Second Review Opinion Notice issued in corresponding Chinese Application No. 202110484661.6, dated Jun. 16, 2023, 9 pages.
International Search Report and Written Opinion issued in corresponding International Application No. PCT/CN2022/090464, mailed on Jul. 19, 2022, 9 pages.

* cited by examiner

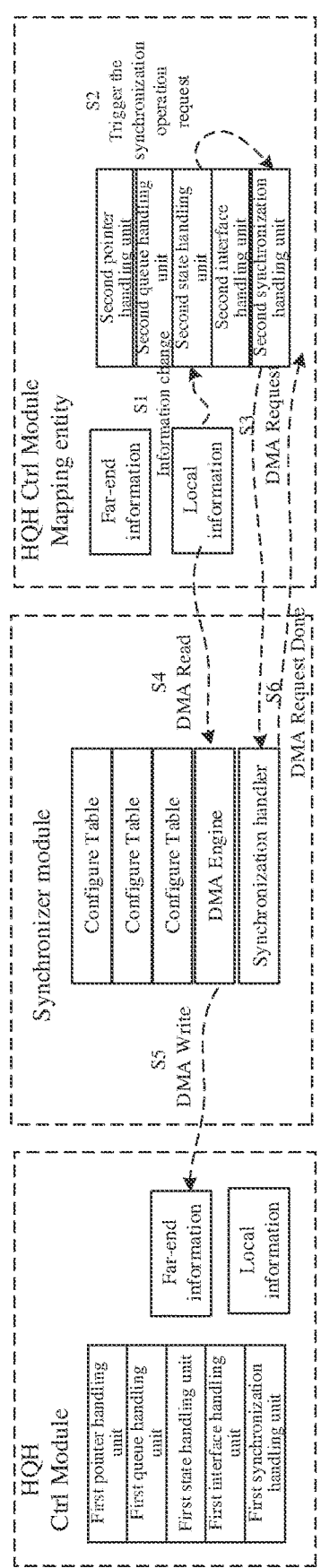
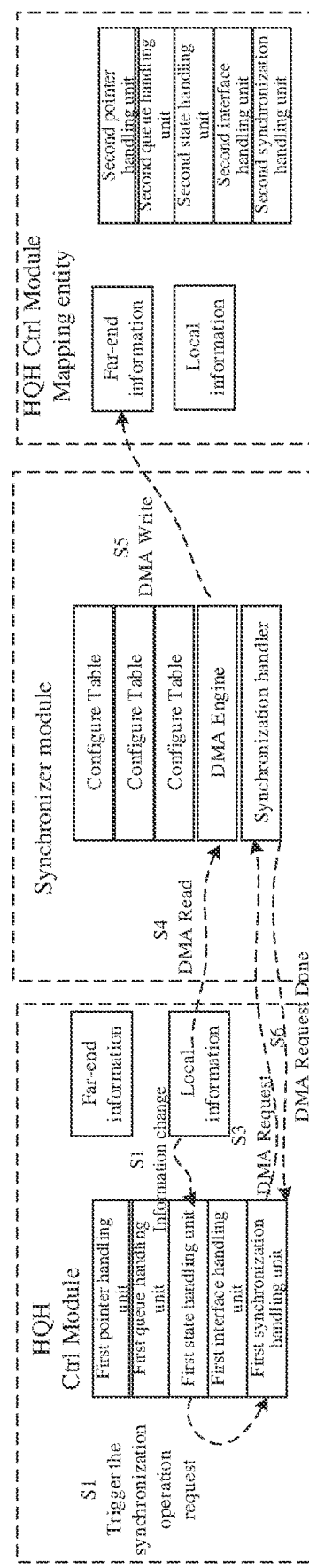
FIG. 9a
FIG. 9b

HARDWARE QUEUE HANDLING SYSTEM, METHOD, SOLID STATE DRIVE CONTROLLER, AND SOLID-STATE DRIVE

CROSS-REFERENCE TO RELATED APPLICATIONS

This application is a continuation of International Application No. PCT/CN2022/090464, filed on Apr. 29, 2022, which claims the benefit of priority to Chinese Patent Application No. 202110484661.6, filed on Apr. 30, 2021. The entire contents of each of the above-referenced applications are expressly incorporated herein by references.

TECHNICAL FIELD

The present disclosure relates to the technical field of solid state drives, and in particular to a hardware queue handling system, method, solid state drive controller, and solid state drive.

BACKGROUND

Solid state drives (SSDs) are hard drives made up of a solid state electronic storage chip array. SSDs comprise control units and storage units (FLASH storage chips or DRAM storage chips).

SSDs are typically controlled through an SSD controller. In the current design of SSD controllers, a hardware queue handler is often configured, usually placed in the vicinity of the hardware module for easy access by the hardware module. However, in relation to the processor, the hardware queue handler is located in a distance from the processor. As a result, the processor needs to cross a bus bridge to access its control module, leading to long delays in hardware module access to the hardware queue handling system. Conversely, if the hardware queue handling system is placed in the vicinity of the processing module, it results in long delays for hardware modules accessing the hardware queue handling system. Consequently, the presently designed hardware queue handling systems suffer from longer delays, impacting access speed.

In light of this, there is an urgent need for improvements in the prior art.

SUMMARY

Embodiments of the present disclosure provide a hardware queue handling system, method, solid state drive controller, and solid state drive, which addresses the technical problem of longer delay when existing hardware modules access a hardware queue handling system, thereby improving the access speed of solid state drives.

To solve the technical problem, embodiments of the present disclosure offer the following technical solutions.

In a first aspect, embodiments of the present disclosure provide a hardware queue handling system applicable to a solid state drive controller, wherein the solid state drive controller comprises a processing module and a hardware module; the system comprises a main module of the hardware queue handler, a mapping module of the hardware queue handler, and a synchronizer module.

wherein the main module and the mapping module are
proximally connected to one of the processing module
or the hardware module through an internal bus,
respectively;

the synchronizer module is configured to actively synchronize information between the main module and the mapping module.

In some embodiments, the main module comprises:
a queue module configured to deliver a read message or a write message; and
a main control module configured to manage a command submission queue and a command completion queue;
the mapping module comprises;
a mapping control module mapped to the main control module and configured to synchronize information in the main control module.

In some embodiments, the hardware queue handling system comprises a plurality of hardware queue handlers, and the hardware module comprises a plurality of hardware units, with each of the hardware queue handlers corresponding one-to-one with one hardware unit;
the main module comprises a plurality of main control modules, and the mapping module comprises a plurality of mapping control modules, with each of the hardware queue handlers corresponding one-to-one with each of the mapping control modules and each of the main control modules.

In some embodiments, the synchronizer module connects to the main module and the mapping module;
the synchronizer module is used to actively synchronize information of the mapping module when the information of the main module changes; or
the synchronizer module is used to actively synchronize information of the main module when the information of the mapping module changes.

In some embodiments, the main module comprises a first synchronization handling unit configured to, when detecting a change in information of the main module, trigger the synchronizer module to synchronize the information of the main module to the module;
the mapping module comprises a second synchronization handling unit configured to, when detecting a change in information of the mapping module, trigger the synchronizer module to synchronize the information of the mapping module to the main module.

In some embodiments, the synchronizer module comprises:
a plurality of synchronization handlers, with each of the synchronization handlers corresponding to one main module and one mapping module, and each of the synchronization handlers being configured to, when the information of the corresponding main module or the information of the corresponding mapping module changes, receive a synchronization operation request sent by the main module or the mapping module;
at least two configuration tables configured to store synchronization operation information from the main module to the mapping module and to store synchronization operation information from the mapping module to the main module; and
a hardware operation controller configured to query the configuration tables and obtain the synchronization operation information to fulfill the synchronization operation request.

In a second aspect, embodiments of the present disclosure provide a hardware queue handling method applicable to the hardware queue handling system according to the first aspect, wherein the method comprises:
triggering a synchronization operation request and sending the synchronization operation request to the synchronizer module when the information of the main module or the information of the mapping module changes; and synchronizing, by the synchronizer module, the information between the main module and the mapping module according to the synchronization operation request.

In some embodiments, synchronizing, by the synchronizer module, the information between the main module and the mapping module according to the synchronization operation request comprises:

querying, by the synchronizer module, the configuration tables to determine synchronization operation information according to the synchronization operation request; and synchronizing, by the synchronizer module, the information between the main module and the mapping module according to the synchronization operation information.

In some embodiments, the method further comprises:

if the main module is proximally connected to the processing module through an internal bus, the mapping module being proximally connected to the hardware module through an internal bus, and in this case:

after the processing module performs a read operation or a write operation, the main control module updating a read pointer or a write pointer and performing a synchronization operation, making the mapping control module to update the read pointer or the write pointer;

after the hardware module performs a read operation or a write operation, the mapping control module updating a read pointer or a write pointer and performing a synchronization operation, making the main control module to update the read pointer or the write pointer; and if the main module is proximally connected to the hardware module through an internal bus, the mapping module being proximally connected to the processing module through an internal bus, and in this case:

after the hardware module performs a read operation or a write operation, the main control module updating a read pointer or a write pointer and performing a synchronization operation, making the mapping control module to update the read pointer or the write pointer:

after the processing module performs a read operation or a write operation, the mapping control module updating a read pointer or a write pointer and performing a synchronization operation, making the main control module to update the read pointer or the write pointer.

In a third aspect, embodiments of the present disclosure provide a solid state drive controller applicable to a solid state drive, wherein the solid state drive comprises at least one flash medium; the solid state drive controller comprises:

the hardware queue handling system according to the first aspect.

In a fourth aspect, embodiments of the present disclosure provide a solid state drive, wherein the solid state drive comprises:

the solid state drive controller according to the third aspect; and at least one flash medium in communication connection with the solid state drive controller.

In a fifth aspect, embodiments of the present disclosure further provide a non-volatile computer-readable storage medium, wherein the computer-readable storage medium stores computer-executable instructions, which are configured to enable the solid state drive to execute the hardware queue handling method as described above.

The beneficial effects of the embodiments of the present disclosure are as follows: In contrast to the prior art, a hardware queue handling system according to the embodiments of the present disclosure is applicable to a solid state drive controller. The solid state drive controller comprises a processing module and a hardware module. The system comprises: a main module of the hardware queue handler, a mapping module of the hardware queue handler, and a synchronizer module, wherein the main module and the mapping module are proximally connected respectively to one of the processing module or the hardware module through the internal bus, respectively; the synchronizer module is configured to actively synchronize information between the main module and the mapping module. By configuration of the mapping module, proximally connecting the main module and the mapping module respectively to one of the processing module or the hardware module through the internal bus, and using the synchronizer module for information synchronization between the main module and the mapping module, embodiments of the present disclosure can reduce path delay during hardware queue access and improve access speed.

BRIEF DESCRIPTION OF THE DRAWINGS

One or more embodiments are exemplified through images in the corresponding accompanying drawings. These exemplary illustrations do not impose limitations on the embodiments. Elements in the accompanying drawings with the same reference number are indicated to be similar elements, unless specifically stated otherwise. The images in the accompanying drawings are not to be construed as limiting in scale.

FIG. 9a is a schematic diagram of the synchronization from a mapping control module to a main control module disclosed according to the embodiments of the present disclosure;

FIG. 9b is a schematic diagram of the synchronization from a main control module to a mapping control module disclosed according to the embodiments of the present disclosure;

DETAILED DESCRIPTION

Figure 1:
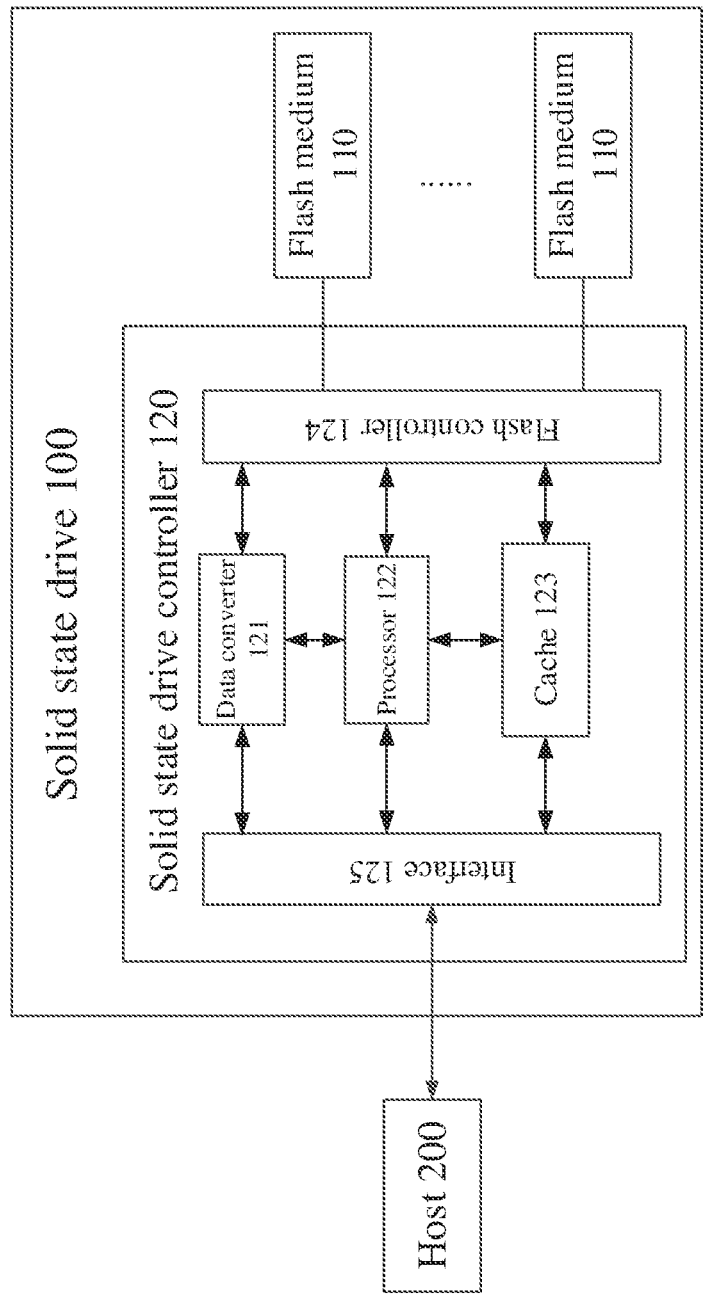
FIG. 1 is a schematic structural diagram of a solid state drive disclosed according to the embodiments of the present disclosure.

In order to make the objectives, technical solutions, and advantages of the embodiments in the present disclosure clearer, the following will provide a description of the technical solutions in the embodiments of the present disclosure, in conjunction with the accompanying drawings in the embodiments of the present disclosure. Apparently, the described embodiments are part of the embodiments in the present disclosure, and not the entirety of them. Based on the embodiments in the present disclosure, all other embodiments that those of ordinary skill in the art may obtain without creative labor shall fall within the protection scope of the present disclosure.

Furthermore, the technical features involved in the various embodiments of the present disclosure described below can be combined with each other as long as they do not conflict.

Typical solid state drives (SSDs) usually comprise a solid state drive controller (main controller), flash array, cache unit, and other peripheral units.

The solid state drive controller serves as the control processing unit, managing the internal system of the SSD. The flash array (NAND Flash), serving as the storage unit, is configured to store data which includes user data and system data. The flash array generally has multiple channels (CH), with each channel independently connecting a set of NAND Flash, such as CH0/CH1 . . . CHx. NAND Flash has a characteristic that requires erasure before writing, and each NAND Flash has a limited number of erase cycles. The cache unit is configured to cache mapping tables and is generally a dynamic random access memory (DRAM). Other peripheral units may comprise sensors, registers, and other components.

In the design process of a solid state drive controller (SSD controller), there is interaction between the processing module and the hardware module through the hardware queue handling system, which comprises a plurality of hardware queue handlers. In existing SSD controller designs, hardware queue handlers are generally placed in the vicinity of the hardware module, connected through an internal bus, which facilitates the hardware to access the control module thereof. However, in relation to the processing module, the hardware queue handler is located in a distance, requiring the processing module to cross a bus bridge to access the control module thereof. This design method results in a long delay when a processing module accesses the hardware queue handling system. Conversely, if the hardware queue handling system is placed in the vicinity of the processing module, there would be a long delay when the hardware module accesses the hardware queue handling system.

Based on this, the embodiments of the present disclosure provide a hardware queue handling system, method, solid state drive controller, and solid state drive to improve the access speed of solid state drives.

The technical solutions of the embodiments in the present disclosure are explained below in conjunction with the accompanying drawings in the specification.

FIG. 1 is a schematic structural diagram of a solid state drive disclosed according to the embodiments of the present disclosure.

As shown in FIG. 1, the solid state drive 100 comprises a flash medium 110 and a solid state drive controller 120 connected to the flash medium 110. The solid state drive 100 is in communication connection with the host 200 through wired or wireless means to achieve data exchange.

The flash medium 110, serving as the storage medium of the solid state drive 100, is also known as flash memory, Flash. Flash storage, or flash chip. It belongs to a type of memory device and is a non-volatile memory that can retain data for extended periods even without a power supply. The storage characteristics of the flash medium 110 are similar to hard drives, making it the foundation of the storage medium in various portable digital devices.

The flash medium 110 can be Nand Flash, which uses a single transistor as a storage unit for binary signals, and has a structure very similar to that of a regular semiconductor transistor. The Nand FLASH differs in that the single transistor thereof incorporates a floating gate and control gate. The floating gate is used to store electrons, and it is covered by a layer of silicon dioxide insulator. The floating gate is coupled to the control gate via a capacitor. When negative electrons are injected into the floating gate under the influence of the control gate, the storage state of the single transistor in Nand Flash changes from "1" to "0". When the negative electrons are removed from the floating gate, the storage state changes from "0" to "1". The insulator covering the surface of the floating gate traps the negative electrons in the floating gate, enabling data storage. In other words, the storage unit in Nand Flash is a floating-gate transistor that stores data in the form of an electric charge. The amount of stored electric charge is related to the magnitude of the voltage applied to the floating-gate transistor.

A Nand FLASH comprises at least one chip, and each chip consists of several physical blocks, with each physical block comprising several pages. A physical block is the smallest unit for erasing operations in Nand FLASH, and a page is the smallest unit for read and write operations in Nand FLASH. The capacity of a Nand FLASH is equal to the number of physical blocks multiplied by the number of pages contained in one physical block and the capacity of an individual page. In some embodiments, the flash medium 10 can be categorized into SLC, MLC, TLC, and QLC based on different voltage levels of storage units.

The solid state drive controller 120 comprises a data converter 121, a processor 122, a cache 123, a flash controller 124, and an interface 125.

The data converter 121 is connected to both the processor 122 and the flash controller 124. The data converter 121 is configured to convert binary data to hexadecimal data and vice versa. In some embodiments, when the flash controller 124 writes data to the flash medium 110, it converts the binary data to be written to hexadecimal data using the data converter 121 and then writes the data to the flash medium 110. When the flash controller 124 reads data from the flash medium 110, it converts the hexadecimal data stored in the flash medium 110 to binary data by using the data converter 121, and then reads the converted data from the binary data page register. The data converter 121 may comprise a binary data register and a hexadecimal data register. The binary data register may be configured to store data converted from hexadecimal to binary, and the hexadecimal data register may be configured to store data converted from binary to hexadecimal.

The processor 122 is connected to the data converter 121, the cache 123, the flash controller 124, and the interface 125, respectively. The processor 122 can be connected to the data converter 121, the cache 123, the flash controller 124, and the interface 125 through a bus or other means. The processor is configured to run non-volatile software programs, instructions, and modules stored in the cache 123 to implement any one of the method embodiments in the present disclosure.

The cache 123 is configured primarily to cache read/write instructions sent by the host 200 and the read or write data obtained from the flash medium 110 based on the read/write instructions sent by the host 200. The cache 123, serving as a non-volatile computer-readable storage medium, can be configured to store non-volatile software programs, non-volatile computer-executable programs, and modules. The cache 123 may comprise a program storage area where an operating system and at least one disclosure needed for functionality can be stored. Furthermore, the cache 123 may comprise a high-speed random access memory, and may further comprise a non-volatile memory, such as at least one magnetic disk memory device, flash memory device, or other non-volatile solid state memory device. In some embodiments, the cache 123 may comprise a memory that is remotely configured relative to the processor 122. Examples of the above network include, but are not limited to, the Internet, intranets, local area networks, mobile communication networks, and combinations thereof. The cache 123 may be a static random access memory (SRAM), a tightly coupled memory (TCM), or a double data rate synchronous dynamic random access memory (DDR SRAM).

The flash controller 124 is connected to the flash medium 110, the data converter 121, the processor 122, and the cache 123. The flash controller is configured to access the back-end flash medium 110 and manage various parameters and data I/O of the flash medium 110; or to provide access interfaces and protocols, implement the corresponding SAS/SATA target protocol end or NVMe protocol end, obtain I/O instructions sent by the host 200, and decode and generate internal private data results for execution; or to be responsible for the core processing of flash translation layer (FTL).

The interface 125 is connected to the host 200, the data converter 121, the processor 122, and the cache 123. The interface is configured to receive data sent by the host 200 or data sent by the processor 122, implementing data transmission between the host 200 and the processor 122. The interface 125 may be in the form of SATA-2 interface, SATA-3 interface, SAS interface, MSATA interface, PCI-E interface, NGFF interface, CFast interface, SFF-8639 interface, and M.2 NVME/SATA protocols.

Figure 2:
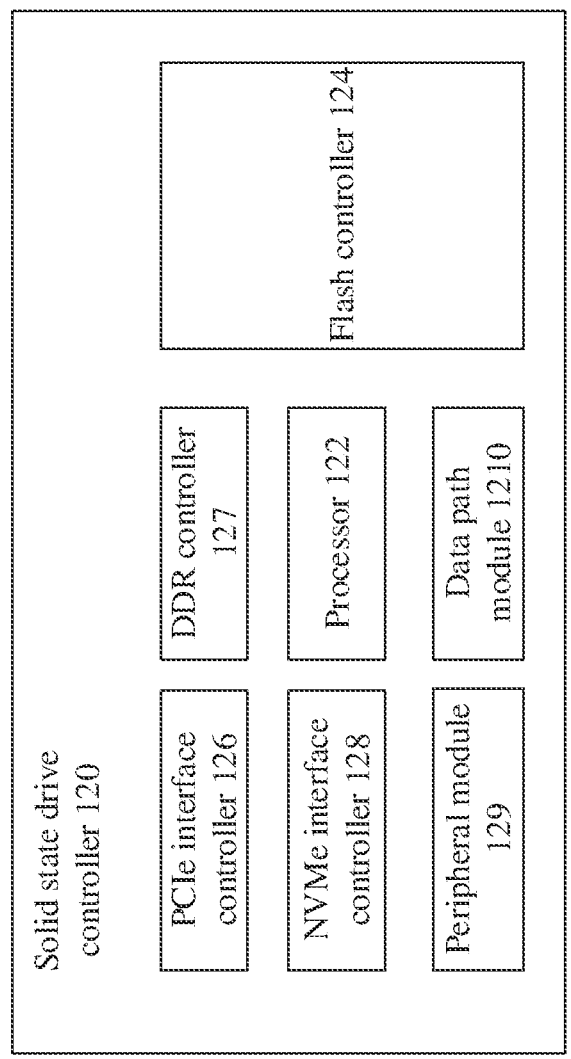
FIG. 2 is a schematic diagram of a solid state drive controller disclosed according to the embodiments of the present disclosure.

FIG. 2 is a schematic structural diagram of a solid state drive controller disclosed according to the embodiments of the present disclosure, wherein the solid state drive controller belongs to the solid state drive as mentioned above.

As shown in FIG. 2, the solid state drive controller comprises a PCIe interface controller 126, a DDR controller 127, an NVMe interface controller 128, a processor 122, a peripheral module 129, a data path module 1210, and a flash controller 124.

In some embodiments, the PCIe interface controller 126 is configured to control PCIe communication protocols, the DDR controller 127 is configured to control the dynamic random access memory, the NVMe interface controller 128 is configured to control NVMe communication protocols, the peripheral module 129 is configured to control other relevant communication protocols, the data path module 1210 is configured to control data paths, such as write cache management, and the flash controller 124 is configured for flash data processing.

This solid state drive controller 120 further comprises a data converter 121, a cache 123, an interface 125, etc.

In some embodiments, the data converter 121 is connected to both the processor and the flash controller. The data converter is configured to convert binary data to hexadecimal data and vice versa. In some embodiments, when the flash controller writes data to the flash medium, it converts the binary data to be written to hexadecimal data using the data converter and then writes the data to the flash medium. When the flash controller reads data from the flash medium, it converts the hexadecimal data stored in the flash medium to binary data using the data converter, and then reads the converted data from the binary data page register. The data converter may comprise a binary data register and a hexadecimal data register. The binary data register may be configured to store data converted from hexadecimal to binary, and the hexadecimal data register may be configured to store data converted from binary to hexadecimal.

In some embodiments, the processor 122 is connected to the data converter 121, the cache 123, the flash controller 124, and the interface 125, respectively. The processor can be connected to the data converter, the cache, the flash controller, and the interface through a bus or other means. The processor is configured to run non-volatile software programs, instructions, and modules stored in the cache to implement any one of the method embodiments in the present disclosure.

In some embodiments, the cache is configured primarily to cache read/write instructions sent by the host and the read or write data obtained from the flash medium based on the read/write instructions sent by the host. The cache, serving as a non-volatile computer-readable storage medium, can be configured to store non-volatile software programs, non-volatile computer-executable programs, and modules. The cache may comprise a program storage area where an operating system and at least one disclosure needed for functionality can be stored. Furthermore, the cache may comprise a high-speed random access memory, and may further comprise a non-volatile memory, such as at least one magnetic disk memory device, flash memory device, or other non-volatile solid state memory device. In some embodiments, the cache may comprise a memory that is remotely configured relative to the processor. Examples of the above network include, but are not limited to, the Internet, intranets, local area networks, mobile communication networks, and combinations thereof. The cache may be a static random access memory (SRAM), a tightly coupled memory (TCM), or a double data rate synchronous dynamic random access memory (DDR SRAM).

In some embodiments, the flash controller is connected to the flash medium, the data converter, the processor, and the cache. The flash controller is configured to access the back-end flash medium and manage various parameters and data I/O of the flash medium; or to provide access interfaces and protocols, implement the corresponding SAS/SATA target protocol end or NVMe protocol end, obtain I/O instructions sent by the host, and decode and generate internal private data results for execution, or to be responsible for the core processing of flash translation layer (FTL).

In some embodiments, the interface is connected to the host, the data converter, the processor, and the cache. The interface is configured to receive data sent by the host or data sent by the processor, implementing data transmission between the host and the processor. The interface may be in the form of a SATA-2 interface, SATA-3 interface, SAS interface, MSATA interface, PCI-E interface, NGFF interface, CFast interface, SFF-8639 interface, and M.2 NVME/SATA protocols.

Figure 3:
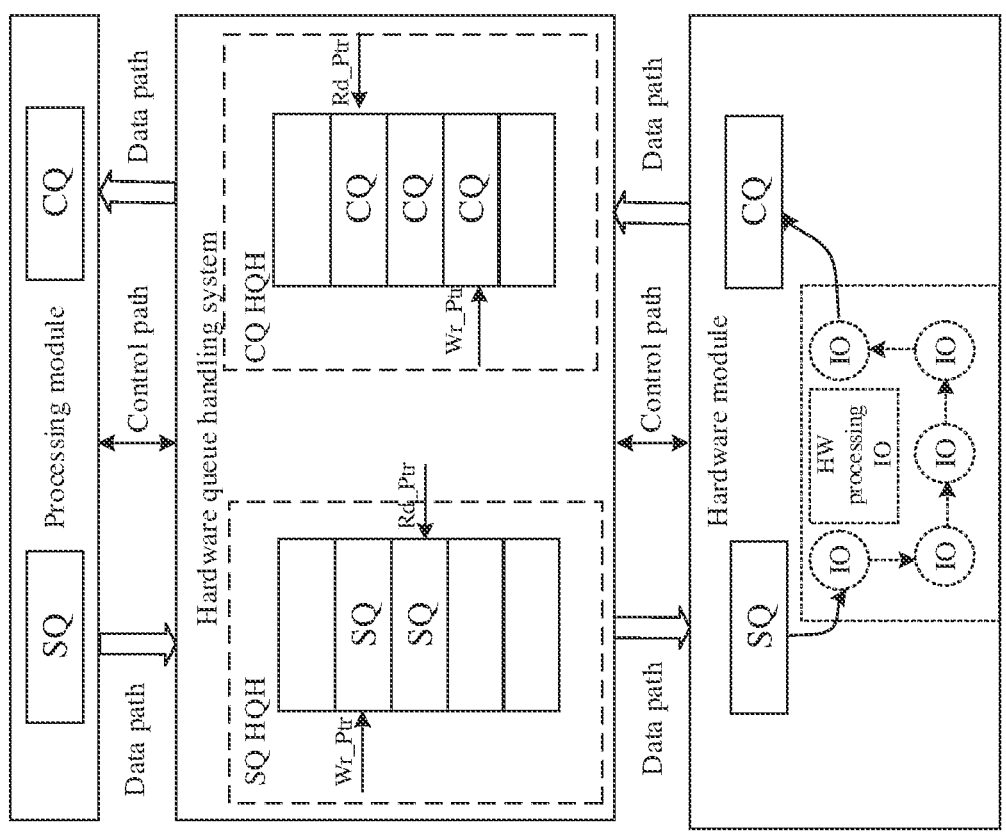
FIG. 3 is a schematic diagram of the interaction between a processing module, a hardware module, and a hardware queue handler disclosed according to the embodiments of the present disclosure.

FIG. 3 is a schematic diagram of the interaction between a processing module, a hardware module, and a hardware queue handler disclosed according to the embodiments of the present disclosure.

As shown in FIG. 3, the processing module, for example, a processor (CPU), and the hardware module (HW Module) interact through the hardware queue handling system. For example, The interaction involves message exchange between the processing module and the hardware module, the hardware module and the processing module, and between the processing module and the processing module. The following takes the processing module as a CPU as an example to explain the message exchange between the processing module and the hardware module:

The message exchange between the processing module and the hardware module involves two hardware queue handlers (HQH), namely, the command submission queue handler (SQ HQH) and the command completion queue handler (CQ HQH), which are configured to manage the command submission queue (SQ) and the command completion queue (CQ), respectively. The command submission queue refers to a command queue sent by the producer of a message (typically a command) to the consumer. For example, when the CPU (acting as the producer) generates a plurality of commands, it sends the commands through the command submission queue to the hardware module (acting as the consumer) that is supposed to execute those commands. The command completion queue, for which the producer of a message is typically a hardware module such as an NVMe module, is configured to return the completion of the command submission queue and related information, allowing the CPU (acting as the consumer) to obtain the information.

As shown in FIG. 3, the interaction between the hardware queue handling system and the processing module and the hardware module involves two paths: a control path and a data path. The control path is implemented through a control bus and is configured to read control information from the queues (primarily the status of the read pointer Rd_Ptr and the write pointer Wr_Ptr as shown in FIG. 3). The data path is implemented through a data bus and is configured to read and write messages.

The access delay referred to in the embodiments of the present disclosure pertains to the access of the control path in the hardware queue management, that is, the read and write access to control information of the hardware queue management.

Figure 4:
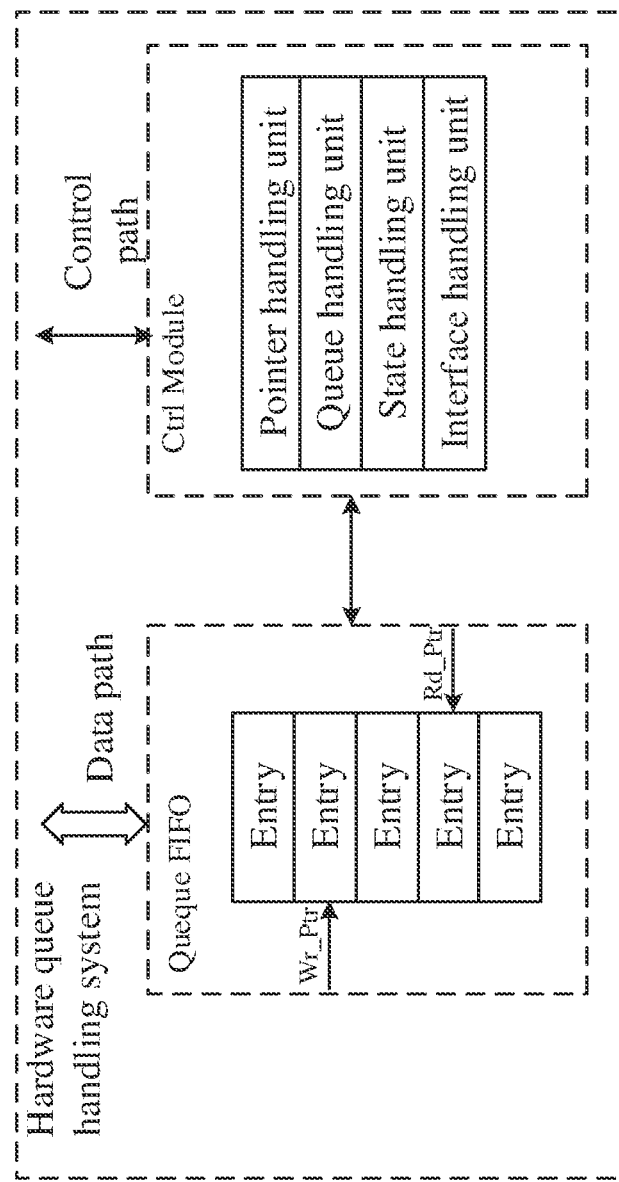
FIG. 4 is a schematic structural diagram of a hardware queue handling system disclosed according to the embodiments of the present disclosure.

FIG. 4 is a schematic structural diagram of a hardware queue handling system disclosed according to the embodiments of the present disclosure.

As shown in FIG. 4, the hardware queue handling system comprises a queue module (Queue FIFO) and a control module (Ctrl Module). The control module comprises a pointer handling unit, a queue handling unit, a state handling unit, and an interface handling unit. The hardware queue handling system comprises a data path and a control path for message interaction with the processing module and the hardware module.

Figure 5:
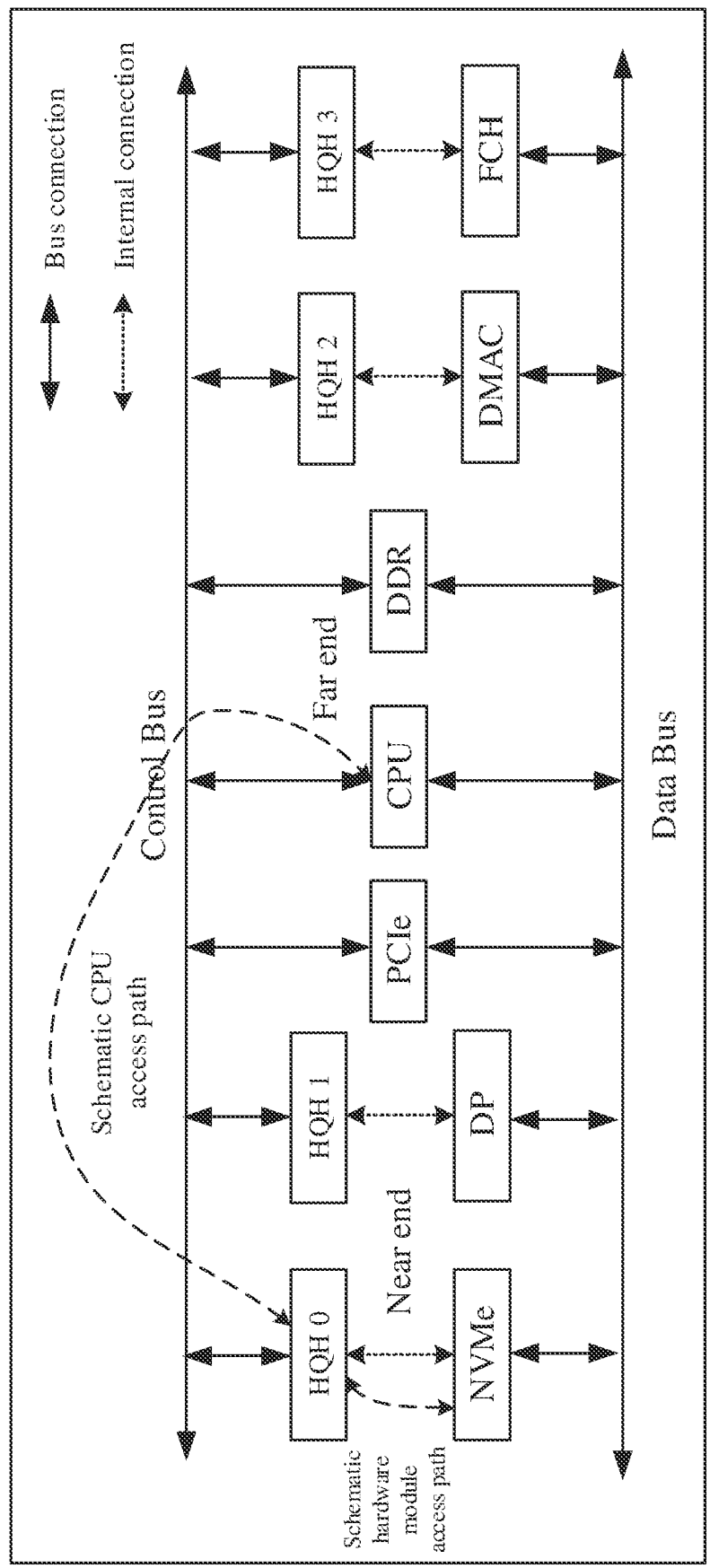
FIG. 5 is a schematic diagram of a schematic CPU access path and a schematic hardware module access path disclosed according to the embodiments of the present disclosure.

FIG. 5 is a schematic diagram of a schematic CPU access path and a schematic hardware module access path disclosed according to the embodiments of the present disclosure.

As shown in FIG. 5, each hardware module corresponds to a hardware queue handler (HQH), for example, the NVMe module corresponds to HQH 0. Since there is only one hardware queue handler, the hardware queue handler can only be configured either near the producer or the consumer. For example, HQH 0 in FIG. 5 is configured near the NVMe module to accelerate hardware operations. It can be understood that the control path between the hardware queue handler and the hardware module is an internal connection (generally not crossing the bus). For example, HQH 0 and the NVMe module are connected through an internal bus, which results in a short access delay. However, the connection between the hardware queue handler and the user (CPU) involves crossing the bus, going from the internal bus to the control bus and then back to the internal bus. Apparently, due to the single-module structure of the existing hardware queue handler, it cannot meet the requirement of being placed near the user simultaneously. As a result, one side of message interaction is accessed by crossing the bus, which entails multiple bus bridges, resulting in a longer access path and higher access delay (in microseconds), thus impacting the overall performance of the solid state drive.

Therefore, in the embodiments of the present disclosure, a new hardware queue handling system is provided to address the access delay issues caused by crossing buses and improve access speed.

Figure 6:
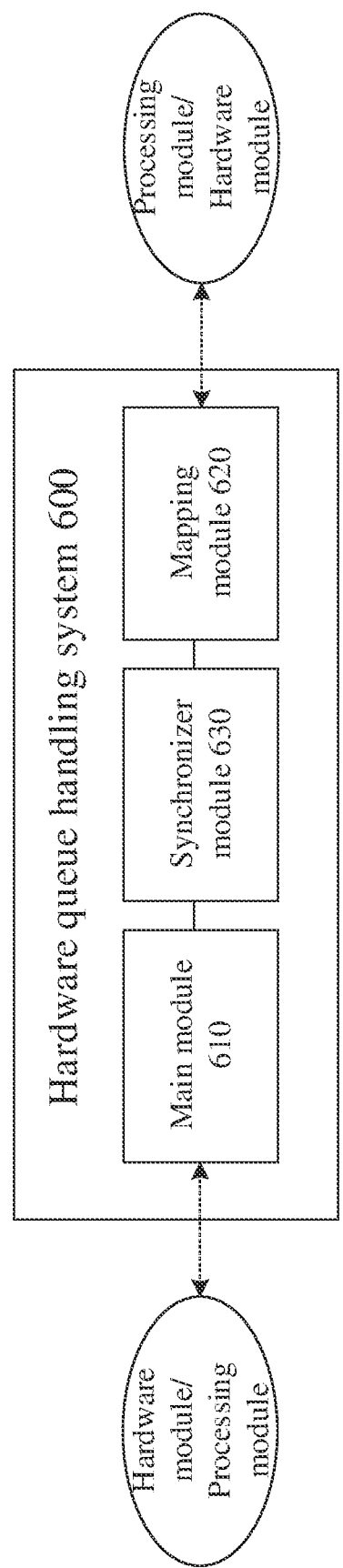
FIG. 6 is a schematic structural diagram of another hardware queue handling system disclosed according to the embodiments of the present disclosure.

FIG. 6 is a schematic structural diagram of another hardware queue handling system disclosed according to the embodiments of the present disclosure.

As shown in FIG. 6, the hardware queue handling system 600 comprises a main module 610 of the hardware queue handler, a mapping module 620 of the hardware queue handler, and a synchronizer module 630. Both the main module 610 and the mapping module 620 are connected to the synchronizer module 630. The main module 610 and the mapping module 620 are proximally connected to one of the processing module or the hardware module through the internal bus, respectively. For example:

(1) The main module 610 is proximally connected to the hardware module through the internal bus, and the mapping module 620 is proximally connected to the processing module through the internal bus; or (2) the main module 610 is proximally connected to the processing module through the internal bus, and the mapping module 620 is proximally connected to the hardware module through the internal bus.

By configuration of the main module 610 and the mapping module 620, the main module 610 and the mapping module 620 are configured in the vicinity of the processing module or the hardware module, respectively. This configuration enables the processing module or the hardware module to access one of the main module 610 and the mapping module 620, respectively. By proximal configuration of the modules, the path delay during access is reduced, thus achieving quick access.

Moreover, the mapping module 620 is the mapping of the main module 610, like a "mirror" or "shadow". That is, the structure and data of the mapping module 620 are identical to the main module 610, allowing the producer/the consumer (the processing module/the hardware module) to respectively access the main module 610 or the mapping module 620 to obtain the same data.

The synchronizer module 630 is configured to actively synchronize information between the main module 610 and the mapping module 620. In some embodiments, when the information of the main module 610 changes, the synchronizer module actively synchronizes the information in the mapping module 620, ensuring consistent information in both the mapping module 620 and the main module 610. Alternatively, when the information of the mapping module 620 changes, the synchronizer module actively synchronizes the information in the main module 610, ensuring consistent information in both the main module 610 and the mapping module 620.

In the embodiments of the present disclosure, instead of being triggered by the visitor access operation, active information synchronization is achieved through the synchronizer module. This is advantageous because when the main module and the mapping module undergo a change in the information, it automatically triggers the synchronizer to synchronize information to the other module, thereby achieving bidirectional synchronization. This solution addresses issues related to information discrepancies between the main module and the mapping module, eliminating delay problems and improving access speed.

Figure 7:
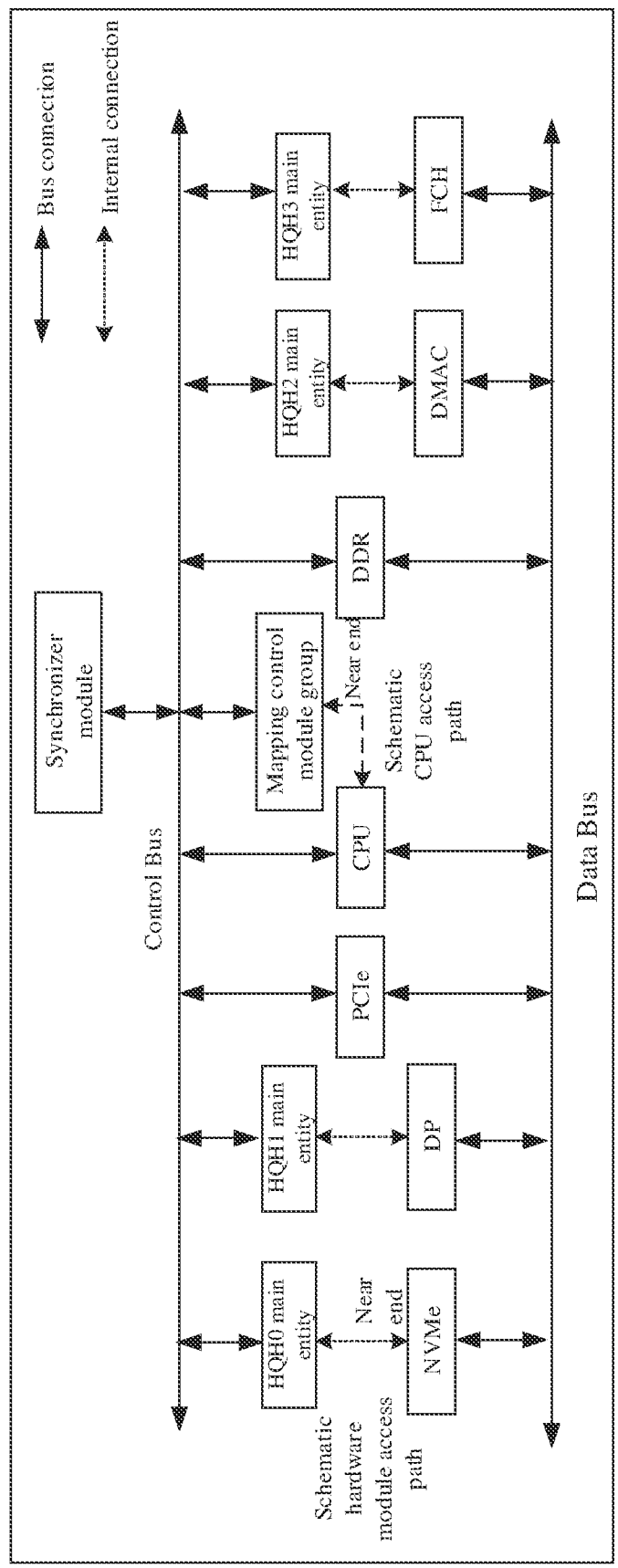
FIG. 7 is a schematic diagram of another schematic CPU access path and schematic hardware module access path disclosed according to the embodiments of the present disclosure.

FIG. 7 is a schematic diagram of another schematic CPU access path and schematic hardware module access path disclosed according to the embodiments of the present disclosure.

As shown in FIG. 7, the HQH0 main is configured in the vicinity of the NVMe module, and the mapping control module group is configured in the vicinity of the CPU on the physical layer, meaning that the main module and the mapping module are placed separately. Each mapping module comprises a mapping control module, and a plurality of mapping control modules form a mapping control module group.

It can be understood that a hardware module comprises a plurality of hardware units. For example, the NVMe module, the DP module, the DMAC module, and the FCH module each correspond to a main module of the hardware queue handler. Each main module corresponds to a mapping module of the hardware queue handler.

Referring to FIG. 5, it can be seen that the main module is configured in the vicinity of the hardware module, and simultaneously the mapping module is configured in the vicinity of the CPU, wherein the hardware module is proximally connected to the main module through the internal bus, and the CPU is also proximally connected to the mapping module through the internal bus. This configuration eliminates the need for cross-bus access between the hardware module and the CPU, significantly reducing delay caused by crossing the bus and improving access speed.

Figure 8:
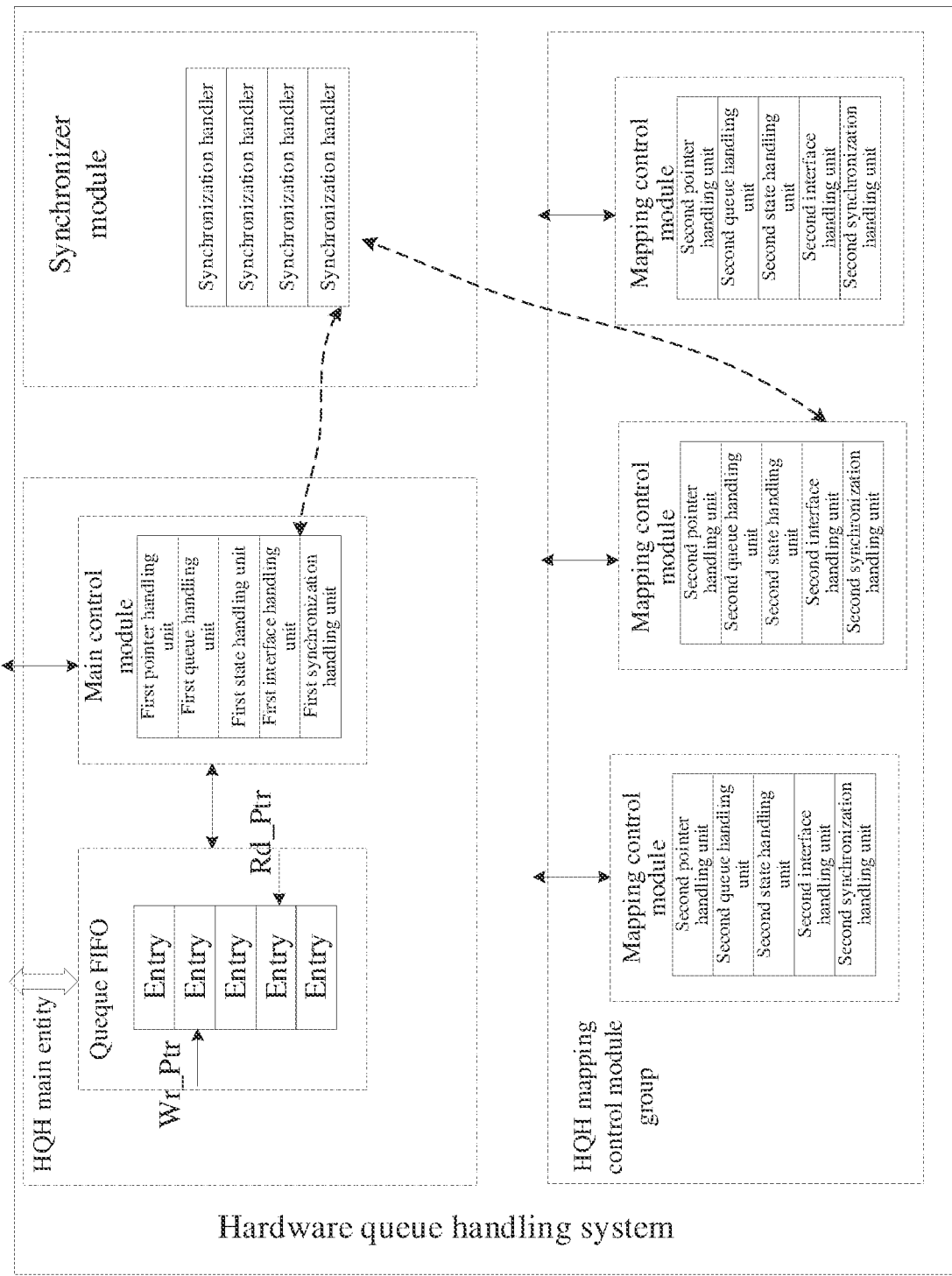
FIG. 8 is a schematic structural diagram of still another hardware queue handling system disclosed according to the embodiments of the present disclosure.

FIG. 8 is a schematic structural diagram of still another hardware queue handling system disclosed according to the embodiments of the present disclosure.

As shown in FIG. 8, the hardware queue handling system (HQH System) comprises a main module of the hardware queue handler (HQH main entity), a mapping module of the hardware queue handler (HQH mapping control module group), and a synchronizer module.

In the embodiments of the present disclosure, the main module and the mapping module are implemented through a hardware state machine and a register.

The HQH main entity comprises a queue module (Queue FIFO) and a main control module. In some embodiments, the queue module is configured to deliver read messages or write messages, such as delivering read messages using a read pointer (Rd_Ptr) or delivering write messages using a write pointer (Wr_Ptr). The main control module is configured to manage the queue, the read and write pointers, the state, the access interface, and the synchronization.

In some embodiments, the main control module configured to manage the command submission queue and the command completion queue comprises:

a first pointer handling unit configured to manage read and write pointers;

a first queue handling unit configured to manage queues, such as the command submission queue and the command completion queue;

a first state handling unit configured to manage states, such as the read and write states of messages;

a first interface handling unit configured to manage access interfaces, such as the first communication interface for communicating with a hardware module or the second communication interface for communicating with a processing module; and a first synchronization handling unit, configured for information synchronization. In some embodiments, the first synchronization handling unit is configured to, when detecting a change in the information in the main module, trigger the synchronizer module to synchronize the information in the main module to the mapping module.

The HQH mapping control module group comprises a plurality of mapping control modules mapped to the main control module. The plurality of mapping control modules are configured to synchronize information in the main control module, and each of the mapping control modules comprises:

a second pointer handling unit configured to manage read and write pointers;

a second queue handling unit configured to manage queues, such as the command submission queue and the command completion queue;

a second state handling unit configured to manage states, such as the read and write states of messages;

a second interface handling unit configured to manage access interfaces, such as the first communication interface for communicating with a hardware module or the second communication interface for communicating with a processing module; and a second synchronization handling unit, configured for information synchronization. In some embodiments, the second synchronization handling unit is configured to, when detecting a change in the information in the mapping module, trigger the synchronizer module to synchronize the information in the mapping module to the main module.

It can be understood that because the main module and the mapping module are in one-to-one correspondence, the main control module and the mapping control module group are in one-to-one correspondence, and as a result, each first synchronization handling unit corresponds one-to-one with a second synchronization handling unit.

In the embodiments of the present disclosure, the hardware queue handling system comprises a plurality of hardware queue handlers, and the hardware module comprises a plurality of hardware units, such as the NVMe module, the DP module, the DMAC module, and the FCH module. Each hardware queue handler corresponds one-to-one with one hardware unit, that is, each hardware unit corresponds to one main module of the hardware queue handler (HQH main entity).

The main module comprises a plurality of main control modules, and the mapping module comprises a plurality of mapping control modules. Each of the hardware queue handlers corresponds one-to-one with each of the mapping control modules and each of the main control modules.

It can be understood that a plurality of synchronization handlers and a plurality of mapping control modules are integrated together, and during system integration, the plurality of synchronization handlers are combined into a synchronizer module, and the plurality of mapping control modules form a mapping control module group. This configuration is advantageous for IC back-end design. The main control modules are dispersed as they are placed near different hardware modules. This means that the main modules are dispersed, whereas the synchronizers and the group of mapping modules are an aggregate, which is advantageous for leveraging the main control modules for near-end control of the message of each hardware module and improving system stability.

As shown in FIG. 8, the synchronizer module comprises a plurality of synchronization handlers. Each of the synchronization handlers corresponds to one main module and one mapping module, and each of the synchronization handlers is configured to, when the information of the corresponding main module or the corresponding mapping module changes, receive a synchronization operation request sent by the main module or the mapping module.

The synchronizer module further comprises:
at least two configuration tables configured to store synchronization operation information from the main module to the mapping module and to store synchronization operation information from the mapping module to the main module, and
a hardware operation controller configured to query the configuration tables and obtain the synchronization operation information to fulfill the synchronization operation request.

In the embodiments of the present disclosure, information changes are detected through hardware circuits, for example, detecting information changes through change-detection circuits. If there is an information change in the main module or the mapping module, it triggers the generation of a synchronization operation request. The hardware operation controller comprises a DMA controller, a microcode controller, a logic state controller, a microprocessing controller, and other hardware controllers. In some embodiments of the present disclosure, the hardware operation controller is a DMA controller. The DMA controller comprises a DMA engine, which is a hardware operation engine configured to perform operations, such as Copy, according to configuration. When the destination address, source address, and data length are configured, the DMA engine performs operations according to these configurations. The configuration table is configured for engine operations and serves as a list of operation actions. The synchronization handling module monitors, initiates, or controls these operation actions.

FIG. 9a is a schematic diagram of the synchronization from a mapping control module to a main control module disclosed according to the embodiments of the present disclosure.

As shown in FIG. 9a, when the information of the mapping control module (HQH Ctrl Module Mapping) changes, for example, when a write operation in the corresponding hardware module of the mapping control module leads to an update in the write pointer, the mapping control module triggers a synchronization operation request. The second synchronization handling unit further generates a DMA request, which requests to copy the pointer, state, and other information from the mapping control module to the main control module. Subsequently, the DMA request is sent to the synchronization handler in the synchronizer module, and a DMA read operation is sent to the DMA engine. The DMA engine performs a DMA write operation, that is, DMA reading information from the source address and then DMA writing the information to the destination address to synchronize with the main control module (HQH Ctrl Module).

FIG. 9b is a schematic diagram of the synchronization from a main control module to a mapping control module disclosed according to the embodiments of the present disclosure.

As shown in FIG. 9b, when the information of the main control module (HQH Ctrl Module) changes, for example, when a write operation in the corresponding hardware module of the main control module leads to an update in the write pointer, the main control module triggers a synchronization operation request. The first synchronization handling unit further generates a DMA request, which requests copying the pointer, state, and other information from the main control module to the mapping control module. Subsequently, the DMA request is sent to the synchronization handler in the synchronizer module, and a DMA read operation is sent to the DMA engine. The DMA engine performs a DMA write operation, that is, DMA reading information from the source address and then DMA writing the information to the destination address to synchronize with the mapping control module (HQH Ctrl Module Mapping).

In the embodiments of the present disclosure, a hardware queue handling system is provided which is applicable to a solid state drive controller. The solid state drive controller comprises a processing module and a hardware module. The system comprises a main module of the hardware queue handler, a mapping module of the hardware queue handler, and a synchronizer module, wherein the main module and the mapping module are proximally connected respectively to one of the processing module or the hardware module through the internal bus; the synchronizer module is configured to actively synchronize information between the main module and the mapping module. By configuration of the mapping module, proximally connecting the main module and the mapping module to one of the processing module or the hardware module through the internal bus, respectively, and using the synchronizer module for information synchronization between the main module and the mapping module, embodiments of the present disclosure can reduce path delay during hardware queue access and improve access speed.

Figure 10:
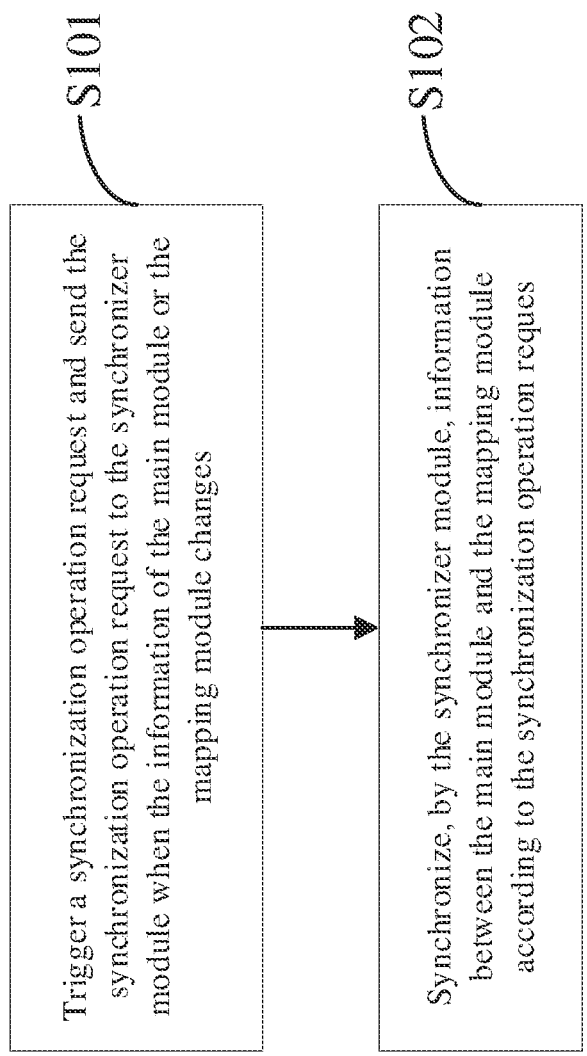
FIG. 10 is a flowchart of a hardware queue handling method disclosed according to the embodiments of the present disclosure.

FIG. 10 is a flowchart of a hardware queue handling method disclosed according to the embodiments of the present disclosure.

As shown in FIG. 10, the hardware queue handling method comprises:

S101: When the main module or the information of the mapping module changes, it triggers a synchronization operation request and sends the synchronization operation request to the synchronizer module.

In some embodiments, when a write operation/read operation in the corresponding processing module/hardware module of the main module/mapping module leads to an update in the write pointer/read pointer, the corresponding module triggers a synchronization operation request and sends the synchronization operation request to the synchronizer module. Furthermore, the first synchronization handling unit/second synchronization handling unit in the main module/mapping module generates a DMA request and sends the DMA request to the corresponding synchronization handler in the synchronizer module.

S102: The synchronizer module synchronizes information between the main module and the mapping module according to the synchronization operation request.

In some embodiments, when the synchronization handler in the synchronizer module receives the DMA request sent by the first synchronization handling unit/second synchronization handling unit in the main module/mapping module, it queries the configuration table according to the DMA request to determine the synchronization operation information. The synchronization handler, based on the synchronization operation information, such as source address, destination address, data length, and other information, initiates a DMA operation. For example, it sends a DMA read operation to the DMA engine, which then performs a DMA write operation, that is, DMA reading information from the source address and then DMA writing the information to the destination address to synchronize with the corresponding main control module or the mapping control module of the main module/mapping module.

Figure 11:
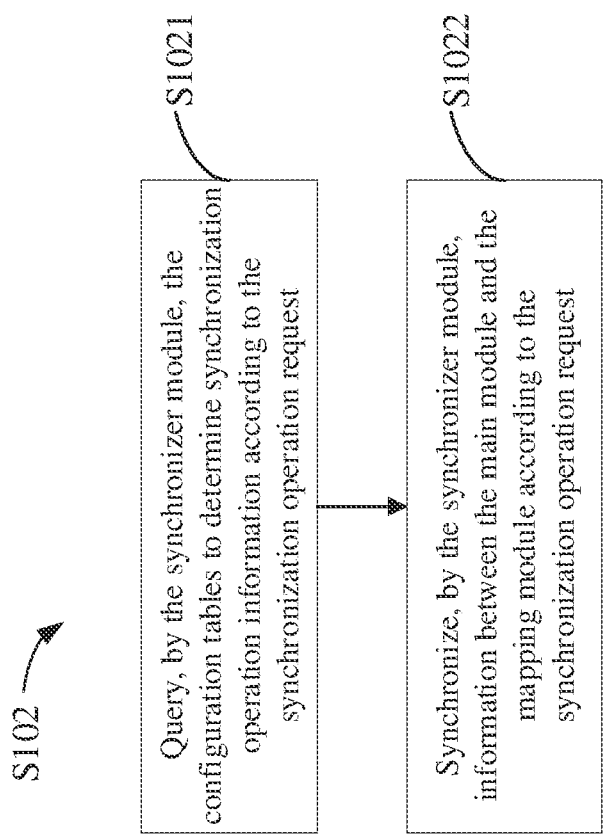
FIG. 11 is an elaborated flowchart of S102 in FIG. 10.

FIG. 11 is an elaborated flowchart of S102 in FIG. 10.

As shown in FIG. 11, S102 in which the synchronizer module synchronizes information between the main module and the mapping module according to the synchronization operation request comprises:

S1021: The synchronizer module queries the configuration table to determine synchronization operation information according to the synchronization operation request.

In some embodiments, the synchronizer module, according to the applicant number corresponding to the applicant of the synchronization operation request, queries the configuration table corresponding to the applicant number. The synchronizer module comprises at least two configuration tables configured to store synchronization operation information from the main module to the mapping module and to store synchronization operation information from the mapping module to the main module. When the applicant of the synchronization operation request is the main module, the synchronizer module queries the configuration table corresponding to the mapping from the main module to the mapping module to obtain the corresponding synchronization operation information. When the applicant of the synchronization operation request is the mapping module, the synchronizer module queries the configuration table corresponding to the mapping from the mapping module to the main module to obtain the corresponding synchronization operation information.

S1022: The synchronizer module synchronizes information between the main module and the mapping module according to the synchronization operation information.

In some embodiments, the synchronizer module, based on the synchronization operation information, such as source address, destination address, data length, and other information, initiates a DMA operation. For example, it sends a DMA read operation to the DMA engine, which then performs a DMA write operation, that is, DMA reading information from the source address and then DMA writing the information to the destination address to synchronize with the corresponding main control module or the mapping control module of the main module/mapping module. In the embodiments of the present disclosure, synchronizing information between the main module and the mapping module through a DMA operation is advantageous for improving synchronization speed.

In the embodiments of the present disclosure, the method further comprises:
if the main module is proximally connected to the processing module through an internal bus, the mapping module being proximally connected to the hardware module through an internal bus, and in this case:
after the processing module performs a read operation or a write operation, the main control module updating a read pointer or a write pointer and performing a synchronization operation, causing the mapping control module to update the read pointer or the write pointer;
after the hardware module performs a read operation or a write operation, the mapping control module updating a read pointer or a write pointer and performing a synchronization operation, causing the main control module to update the read pointer or the write pointer; and
if the main module is proximally connected to the hardware module through an internal bus, the mapping module being proximally connected to the processing module through an internal bus, and in this case:
after the hardware module performs a read operation or a write operation, the main control module updating a read pointer or a write pointer and performing a synchronization operation, causing the mapping control module to update the read pointer or the write pointer;
after the processing module performs a read operation or a write operation, the mapping control module updating a read pointer or a write pointer and performing a synchronization operation, causing the main control module to update the read pointer or the write pointer.

Figure 12:
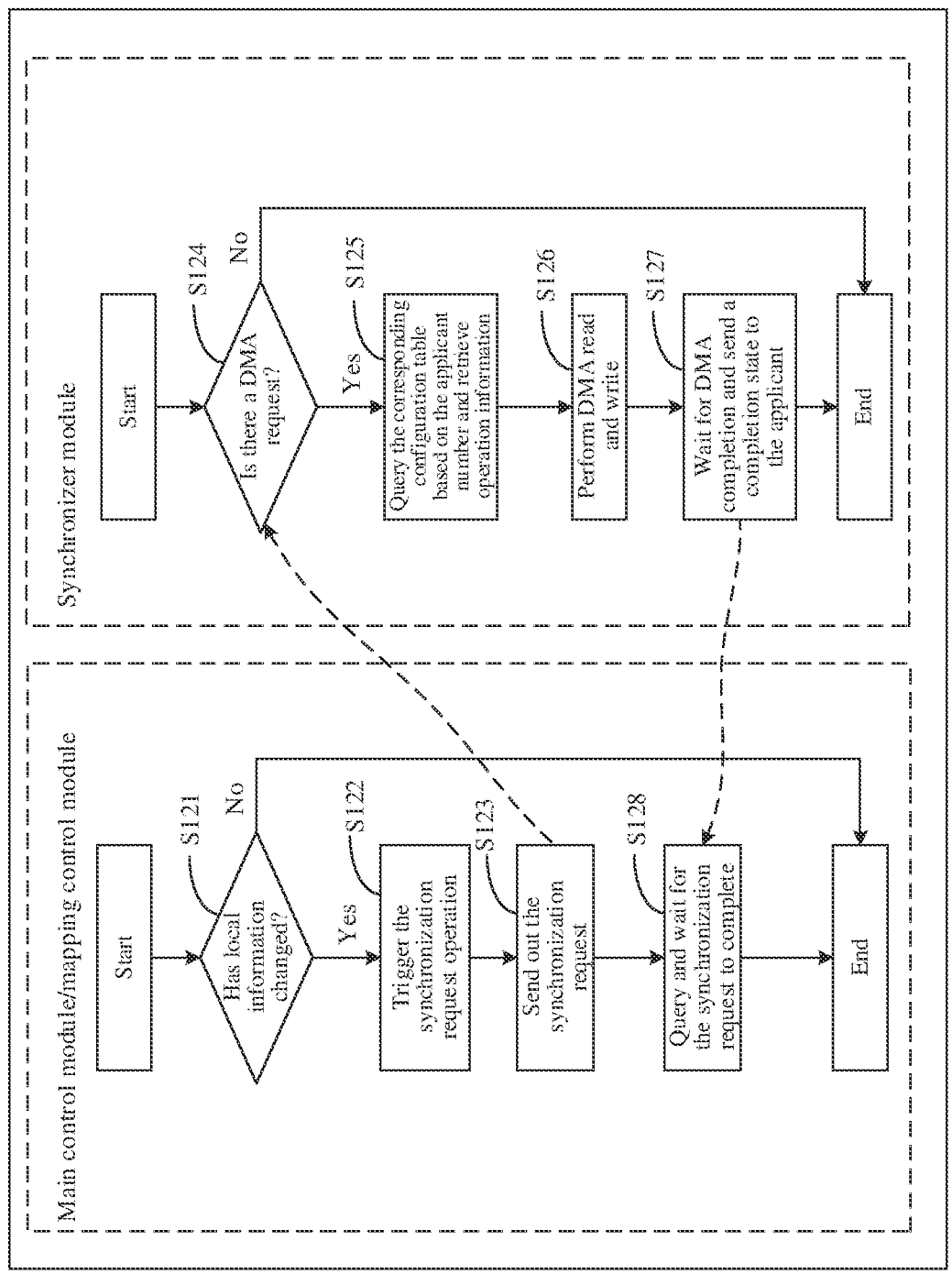
FIG. 12 is an overall flowchart of the synchronization process between a main control module/mapping control module and a synchronizer module disclosed according to the embodiments of the present disclosure.

FIG. 12 is an overall flowchart of the synchronization process between the main control module/mapping control module and the synchronizer module disclosed according to the embodiments of the present disclosure.

As shown in FIG. 12, the overall flow of the synchronization process between the main control module/mapping control module and the synchronizer module comprises:
Start.

S121: Has local information changed?

In some embodiments, determine whether the local information of the main module or the mapping module has changed. If yes, proceed to S122: Trigger a synchronization request operation. If not, end.

S122: Trigger the synchronization request operation.

S123: Send out the synchronization request.

S124: Is there a DMA request?

In some embodiments, the synchronization handler in the synchronizer module determines whether a DMA request has been received. If yes, proceed to S125: Query the corresponding configuration table based on the applicant number and retrieve operation information. If not, end.

S125: Query the corresponding configuration table based on the applicant number and retrieve operation information.

In some embodiments, the synchronizer module, according to the applicant number corresponding to the applicant of the synchronization operation request, queries the configuration table corresponding to the applicant number. The synchronizer module comprises at least two configuration tables configured to store synchronization operation information from the main module to the mapping module and to store synchronization operation information from the mapping module to the main module. When the applicant of the synchronization operation request is the main module, the synchronizer module queries the configuration table corresponding to the mapping from the main module to the mapping module to obtain the corresponding synchronization operation information. When the applicant of the synchronization operation request is the mapping module, the synchronizer module queries the configuration table corresponding to the mapping from the mapping module to the main module to obtain the corresponding synchronization operation information.

It can be understood that in the present disclosure, it is required to establish a configuration table in advance where one applicant number corresponds to one configuration table. The corresponding configuration table in the configuration table items can be determined based on the applicant number.

S126: Perform DMA read and write.

S127: Wait for DMA completion and send a completion state to the applicant.

S128: Query and wait for the synchronization request to complete.

Figure 13:
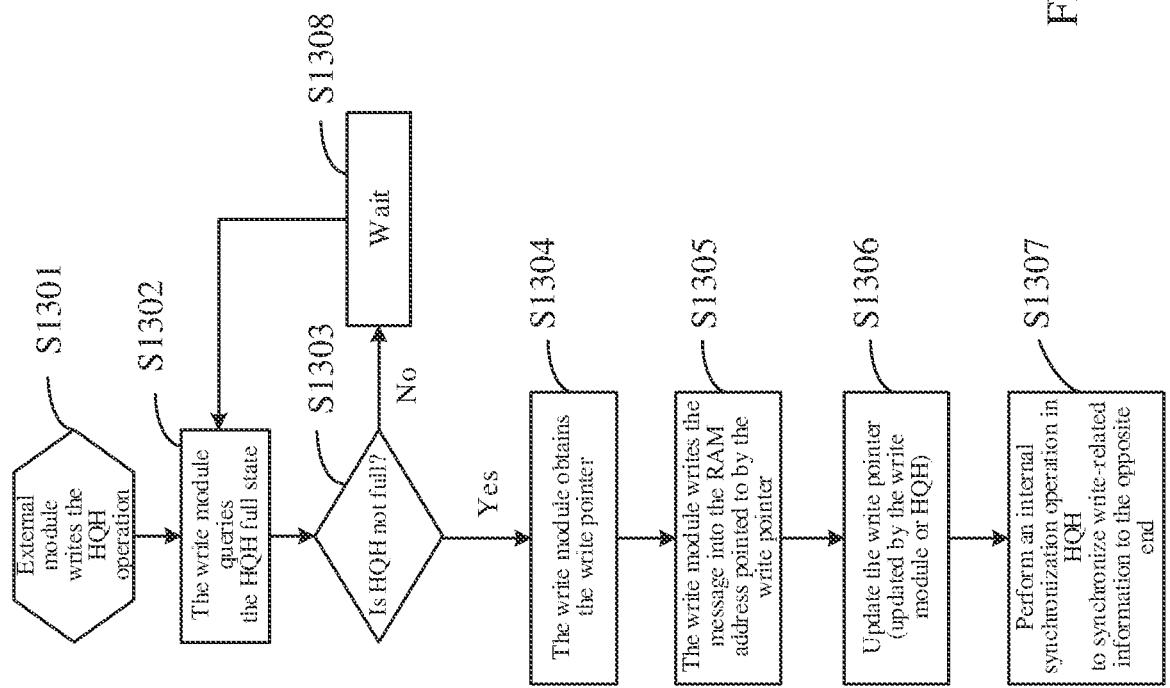
FIG. 13 is a flowchart of the write operation of an external module disclosed according to the embodiments of the present disclosure.

FIG. 13 is a flowchart of the write operation of an external module disclosed according to the embodiments of the present disclosure.

As shown in FIG. 13, the write operation process of the external module comprises: S1301: External module writes the HQH operation.

In some embodiments, the external module refers to a processing module or a hardware module.

S1302: The write module queries the HQH full state.

In some embodiments, the write module can be a processing module or a hardware module. When the processing module or the hardware module performs a write operation, it serves as the write module. The state of the command submission queue and the command completion queue comprises a non-full state and a full state.

S1303: Determine if HQH is not full.

In some embodiments, the write module determines whether the command submission queue or the command completion queue in the queue module is in a non-full state. If yes, proceed to S1304: Write module obtains a write pointer. If not, proceed to S1308: Wait.

S1304: The write module obtains the write pointer.

S1305: The write module writes the message into the RAM address pointed to by the write pointer.

S1306: Update the write pointer (updated by the write module or HQH).

S1307: Perform an internal synchronization operation in HQH to synchronize write-related information to the opposite end.

In some embodiments, when the write module is a processing module, if the processing module corresponds to the main control module, then the opposite end refers to the mapping control module. Conversely, if the processing module corresponds to the mapping control module, then the opposite end refers to the main control module.

S1308: Wait.

Figure 14:
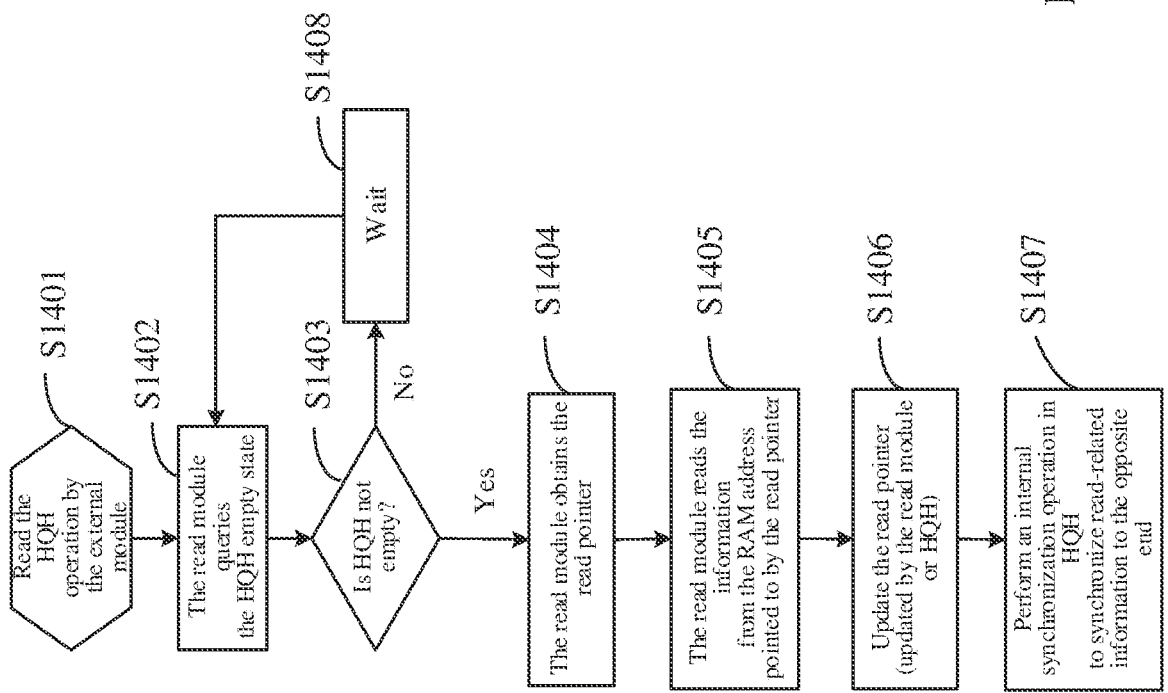
FIG. 14 is a flowchart of the read operation of an external module disclosed according to the embodiments of the present disclosure.

FIG. 14 is a flowchart of the read operation of an external module disclosed according to the embodiments of the present disclosure.

As shown in FIG. 14, the read operation process of the external module comprises:

S1401: External module reads the HQH operation.

In some embodiments, the external module refers to a processing module or a hardware module.

S1402: The read module queries the HQH empty state.

In some embodiments, the state of the command submission queue and the command completion queue comprises a non-empty state or an empty state.

S1403: Determine if HQH is not empty.

In some embodiments, the read module determines whether the command submission queue or the command completion queue in the queue module is in a non-empty state. If yes, proceed to S1404: Read module obtains a read pointer. If not, proceed to S1408; Wait.

S1404: The read module obtains the read pointer.

S1405: The read module reads the information from the RAM address pointed to by the read pointer.

S1406: Update the read pointer (updated by the read module or HQH).

S1407: Perform an internal synchronization operation in HQH to synchronize read-related information to the opposite end.

S1408: Wait.

In some embodiments, operations for the command submission queue (SQ)/the command completion queue (CQ) involve a pair of write and read operations, which are illustrated respectively with the following examples:

1. Operations for the command submission queue, using the example of a write operation by the processing module and a read operation by the hardware module:
    (1) The processing module queries the full flag of the corresponding SQ hardware queue handler control module (mapping entity). If it is not full, the processing module prepares to write a message (Entry) into the queue module (Queque FIFO); otherwise, the processing module waits.
    (2) The processing module reads the write pointer (Wr_Ptr) of the corresponding SQ hardware queue handler control module (mapping entity) and writes the message into the space pointed to by the pointer.
    (3) If automatic write pointer updates are not enabled or supported, the processing module needs to update the write pointer; otherwise, the hardware queue handler automatically updates the write pointer.
    (4) An internal synchronization operation is performed in the hardware queue handler to synchronize write-related information to the opposite end, i.e., the main control module.
    (5) The hardware module detects the empty flag of the corresponding SQ hardware queue handler control module (main entity). If it is not empty, it indicates that there are pending commands in the queue; otherwise, the hardware module detects it again next time.
    (6) When the SQ hardware queue handler control module (main entity) is not empty, the hardware module obtains the read pointer (Rd_Ptr) and, through an internal connecting line, retrieves the message (Entry) from the space pointed to by the read pointer (Rd_Ptr). The hardware module then executes the IO operation expressed by the message.
    (7) If automatic read pointer updates are not enabled or supported, the hardware module needs to update the read pointer; otherwise, the hardware queue handler automatically updates the read pointer.
    (8) An internal synchronization operation is performed in the hardware queue handler to synchronize read-related information to the opposite end, with the opposite end being the mapping control module in this case.

2. Operations for the command completion queue:
(1) After the hardware module completes a command, it detects the full state of the corresponding CQ hardware queue handler control module (main entity). If it is not full, the hardware module prepares to write a message into the command completion queue (CQ FIFO); otherwise, the hardware module waits.
(2) The hardware module reads the write pointer of the corresponding CQ hardware queue handler control module (main entity) and writes the message into the space pointed to by the pointer.
(3) If automatic write pointer updates are not enabled or supported, the hardware module needs to update the write pointer: otherwise, the hardware queue handler automatically updates the write pointer.
(4) An internal synchronization operation is performed in the hardware queue handler to synchronize read-related information to the opposite end, i.e., the mapping control module.
(5) The CPU detects the empty flag of the corresponding CQ hardware queue handler control module (mapping entity). If it is not empty, it indicates that there are pending messages in the queue; otherwise, the CPU detects it again next time.
(6) When the corresponding CQ hardware queue handler control module (mapping entity) is not empty, the CPU obtains the read pointer (Rd_Ptr) of the corresponding CQ hardware queue handler control module (mapping entity) and, through an internal connecting line, retrieves the message (Entry) from the space pointed to by the read pointer. The CPU then learns the completion state information of the IO operation expressed by the message.
(7) If automatic read pointer updates are not enabled or supported, the processing module needs to update the read pointer: otherwise, the hardware queue handler automatically updates the read pointer.
(8) An internal synchronization operation is performed in the hardware queue handler to synchronize write-related information to the opposite end, with the opposite end being the main control module in this case.

It can be understood that the operations for the command completion queue (CQ) are mirror-image symmetrical operations to the operations for the command submission queue (SQ). That is, the roles of the processing module and the hardware module are exchanged. Moreover, regardless of which one is updating the pointer, it will trigger the operation of information synchronization.

In the embodiments of the present disclosure, the external module (the processing module or the hardware module) is invisible to the synchronization operation, such as querying whether the state is non-empty to determine whether to retrieve the message. Instead, the hardware queue handler triggers the synchronization operation when an external operation leads to control information changes, primarily pointer updates. This eliminates the need to consider synchronization issues separately, whether in software design, such as processor operations, or in hardware module design.

Figure 15:
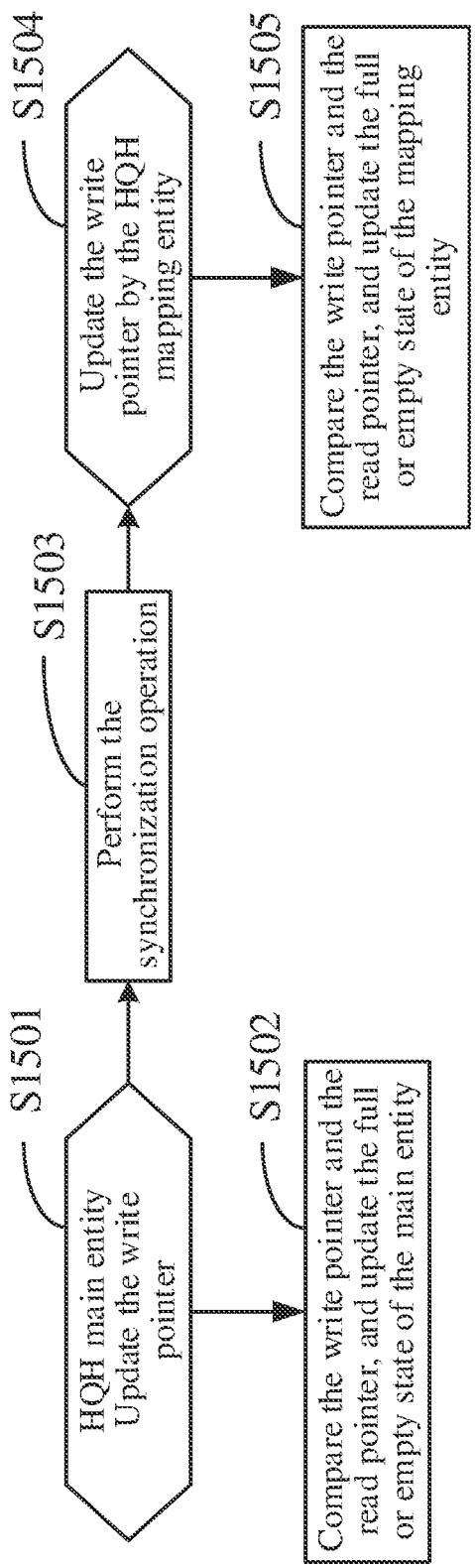
FIG. 15 is a flowchart of the updating of a write pointer disclosed according to the embodiments of the present disclosure.

FIG. 15 is a flowchart of the updating of a write pointer disclosed according to the embodiments of the present disclosure.

As shown in FIG. 15, the process of updating a write pointer comprises:
S1501: Update the write pointer by the HQH main entity.
S1502: Compare the write pointer and the read pointer, and update the full or empty state of the main entity.
S1503: Perform the synchronization operation.
S1504: Update the write pointer by the HQH mapping entity.
S1505: Compare the write pointer and the read pointer, and update the full or empty state of the mapping entity.

Figure 16:
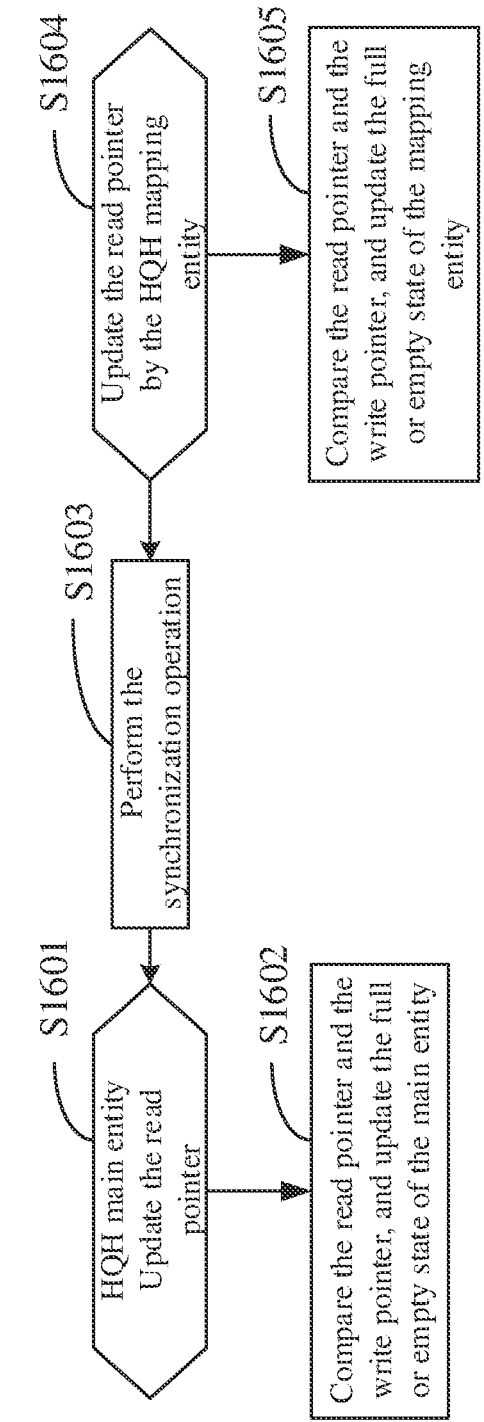
FIG. 16 is a flowchart of the updating of a read pointer disclosed according to the embodiments of the present disclosure.

FIG. 16 is a flowchart of the updating of a read pointer disclosed according to the embodiments of the present disclosure.

As shown in FIG. 16, the process of updating a read pointer comprises:
S1601: Update the read pointer by the HQH main entity.
S1602: Compare the read pointer and the write pointer, and update the full or empty state of the main entity.
S1603: Perform the synchronization operation.
S1604: Update the read pointer by the HQH mapping entity.
S1605: Compare the read pointer and the write pointer, and update the full or empty state of the mapping entity.

In the embodiments of the present disclosure, a hardware queue handling method is provided, which is applicable to the above hardware queue handling system. The hardware queue handling method comprises: triggering a synchronization operation request and sending the synchronization operation request to the synchronizer module when the main module or the information of the mapping module changes; and synchronizing, by the synchronizer module, the information between the main module and the mapping module according to the synchronization operation request. By sending the synchronization operation request to the synchronizer module after information changes, the synchronizer module synchronizes information between the main module and the mapping module. In this way, the present disclosure can reduce path delays during hardware queue access and improve access speed.

Embodiments of the present disclosure further provide a non-volatile computer storage medium that stores computer-executable instructions. The computer-executable instructions are executed by one or more processors, and for example, the aforementioned one or more processors can execute the hardware queue handling method in any one of the method embodiments mentioned above, such as executing the hardware queue handling method in any one of the method embodiments mentioned above, and executing each of the steps described above.

The apparatus and device embodiments described above are merely illustrative, wherein the unit modules described as separate components may or may not be physically separated, and components displayed as module units may or may not be physical units; i.e., they may be located in one position, or may be distributed on multiple network module units. Some or all of the modules can be selected according to actual needs to achieve the purpose of the schemes of the embodiments.

From the descriptions of the above embodiments, those skilled in the art can clearly understand that various embodiments can be implemented through a software and general hardware platform or through hardware alone. With this understanding, the essential parts or the parts contributing to the related art in the above technical solutions can be embodied in the form of a software product. This computer software product can be stored on computer-readable storage media such as ROM/RAM, magnetic disks, and optical disks, and may comprise several instructions for causing a computer device (which may be a personal computer, a server, or a network device, etc.) to perform to perform methods of various embodiments or portions thereof.

Finally, it should be noted that the above embodiments are only intended to illustrate the technical solutions of the present disclosure and are not intended to limit them. Within the concept of the present disclosure, the technical features in the above embodiments or different embodiments can also be combined, steps can be performed in any order, and many other variations in different aspects of the present disclosure may exist, which are not provided in detail for the sake of brevity. Despite the detailed description in reference to the previous embodiments, those of ordinary skill in the art should understand that the technical solutions described in the various embodiments can still be modified or some of the technical features therein can be replaced with equivalent alternatives. Such modifications or replacements do not take the essence of the respective technical solutions outside the scope of the various embodiments of the present disclosure.

The invention claimed is:

1. A system for hardware queue handling applicable to a solid state drive controller, wherein the solid state drive controller comprises a processing module and a hardware module, and the system comprises:
a main module of a hardware queue handler that is proximally connected to one of the processing module or the hardware module through a first internal bus;
a mapping module of the hardware queue handler that is proximally connected to the other one of the processing module or the hardware module through a second internal bus; and
a synchronizer module,
wherein the main module, the mapping module, and the synchronizer module are connected to a control bus, respectively, and
wherein the synchronizer module is configured to actively synchronize information between the main module and the mapping module.

2. The system according to claim 1, wherein the main module comprises:
a queue module configured to deliver a read message or a write message; and
a main control module configured to manage a command submission queue and a command completion queue, wherein the mapping module comprises:
a mapping control module mapped to the main control module and configured to synchronize information in the main control module.

3. The system according to claim 2, wherein:
the system comprises a plurality of hardware queue handlers, and the hardware module comprises a plurality of hardware units, with each of the hardware queue handlers having a one-to-one correspondence with a respective one of the hardware units; and
the main module comprises a plurality of main control modules, and the mapping module comprises a plurality of mapping control modules, with each of the hardware queue handlers having a one-to-one correspondence with a respective one of the mapping control modules and a one-to-one correspondence with a respective one of the main control modules.

4. The system according to claim 1, wherein the synchronizer module connects to the main module and the mapping module;

the synchronizer module is used to actively synchronize information of the mapping module when information of the main module changes; or
the synchronizer module is used to actively synchronize the information of the main module when the information of the mapping module changes.

5. The system according to claim 4, wherein
the main module comprises a first synchronization handling unit configured to, when detecting a change in the information of the main module, trigger the synchronizer module to synchronize the information of the main module to the mapping module; and
the mapping module comprises a second synchronization handling unit configured to, when detecting a change in the information of the mapping module, trigger the synchronizer module to synchronize the information of the mapping module to the main module.

6. The system according to claim 1, wherein the synchronizer module comprises:
a synchronization handler corresponding to the main module and the mapping module, and configured to, when first information of the main module or second information of the mapping module changes, receive a synchronization operation request sent by the main module or the mapping module;
at least two configuration tables configured to store first synchronization operation information from the main module to the mapping module and to store second synchronization operation information from the mapping module to the main module, respectively; and
a hardware operation controller configured to query the configuration tables and obtain the first or second synchronization operation information to fulfill the synchronization operation request.

7. A method for hardware queue handling applicable to a hardware queue handling system, wherein the hardware queue handling system is applicable to a solid state drive controller, and the solid state drive controller comprises a processing module and a hardware module, and the hardware queue handling system comprises a main module, a mapping module, and a synchronizer module, wherein:
the main module is proximally connected to one of the processing module or the hardware module through a first internal bus;
the mapping module is proximally connected to the other one of the processing module or the hardware module through a second internal bus;
the main module, the mapping module, and the synchronizer module are connected to a control bus, respectively;
the synchronizer module is configured to actively synchronize information between the main module and the mapping module; and
the method comprises:
triggering a synchronization operation request and sending the synchronization operation request to the synchronizer module when first information of the main module or second information of the mapping module changes; and
synchronizing, by the synchronizer module, the first information of the main module from the main module to the mapping module when the first information of the main module changes or the second information of the mapping module from the mapping module to the main module when the second information of the mapping module changes according to the synchronization operation request.

8. The method according to claim 7, wherein synchronizing, by the synchronizer module, the first information of the main module from the main module to the mapping module when the first information of the main module changes or the second information of the mapping module from the mapping module to the main module when the second information of the mapping module changes according to the synchronization operation request, comprises:

querying, by the synchronizer module, at least two configuration tables to determine synchronization operation information according to the synchronization operation request; and synchronizing, by the synchronizer module, the first information of the main module from the main module to the mapping module when the first information of the main module changes or the second information of the mapping module from the mapping module to the main module when the second information of the mapping module changes according to the synchronization operation information.

9. The method according to claim 8, further comprising:
if the main module is proximally connected to the processing module through the first internal bus, and the mapping module is proximally connected to the hardware module through the second internal bus:
  after the processing module performs a first read operation or a first write operation, the main module updating a first read pointer or a first write pointer and performing a first synchronization operation, making the mapping module to update a second read pointer or a second write pointer;
  after the hardware module performs a second read operation or a second write operation, the mapping module updating the second read pointer or the second write pointer and performing a second synchronization operation, making the main module to update the first read pointer or the first write pointer; and
if the main module is proximally connected to the hardware module through the first internal bus, and the mapping module is proximally connected to the processing module through the second internal bus:
  after the hardware module performs a third read operation or a third write operation, the main module updating the first read pointer or the first write pointer and performing a third synchronization operation, making the mapping module to update the second read pointer or the second write pointer; and
  after the processing module performs a fourth read operation or a fourth write operation, the mapping module updating the second read pointer or the second write pointer and performing a fourth synchronization operation, making the main module to update the first read pointer or the first write pointer.

10. A solid state drive controller applicable to a solid state drive, wherein the solid state drive comprises at least one flash medium, and the solid state drive controller comprises:
a processing module;
a hardware module; and
a hardware queue handling system, wherein the hardware queue handling system comprises a main module of a hardware queue handler, a mapping module of the hardware queue handler, and a synchronizer module,
wherein the main module is proximally connected to one of the processing module or the hardware module through a first internal bus,
wherein the mapping module is proximally connected to the other one of the processing module or the hardware module through a second internal bus,
wherein the main module, the mapping module, and the synchronizer module are connected to a control bus, respectively, and
wherein the synchronizer module is configured to actively synchronize information between the main module and the mapping module.

11. The solid state drive controller according to claim 10, wherein the main module comprises:
a queue module configured to deliver a read message or a write message; and
a main control module configured to manage a command submission queue and a command completion queue, and
wherein the mapping module comprises:
a mapping control module mapped to the main control module and configured to synchronize information in the main control module.

12. The solid state drive controller according to claim 11, wherein:
the hardware queue handling system comprises a plurality of hardware queue handlers, and the hardware module comprises a plurality of hardware units, with each of the hardware queue handlers having a one-to-one correspondence with a respective one of the hardware units; and
the main module comprises a plurality of main control modules, and the mapping module comprises a plurality of mapping control modules, with each of the hardware queue handlers having a one-to-one correspondence with a respective one of the mapping control modules and a respective one of the main control modules.

13. The solid state drive controller according to claim 10, wherein the synchronizer module connects to the main module and the mapping module;
the synchronizer module is used to actively synchronize information of the mapping module when information of the main module changes; or
the synchronizer module is used to actively synchronize the information of the main module when the information of the mapping module changes.

14. The solid state drive controller according to claim 13, wherein
the main module comprises a first synchronization handling unit configured to, when detecting a change in the information of the main module, trigger the synchronizer module to synchronize the information of the main module to the mapping module; and
the mapping module comprises a second synchronization handling unit configured to, when detecting a change in the information of the mapping module, trigger the synchronizer module to synchronize the information of the mapping module to the main module.

15. The solid state drive controller according to claim 10, wherein the synchronizer module comprises:
a synchronization handler corresponding to the main module and the mapping module, and configured to, when first information of the main module or second information of the mapping module changes, receive a synchronization operation request sent by the main module or the mapping module;
at least two configuration tables configured to store first synchronization operation information from the main module to the mapping module and to store second synchronization operation information from the mapping module to the main module, respectively; and a hardware operation controller configured to query the configuration tables and obtain the first or second synchronization operation information to fulfill the synchronization operation request.

\* \* \* \* \*